United States Patent
Ichihara et al.

[11] Patent Number: 5,889,756
[45] Date of Patent: Mar. 30, 1999

[54] PHASE CHANGE OPTICAL RECORDING MEDIUM

[75] Inventors: Katsutaro Ichihara, Yokohama; Keiichiro Yusu, Kawasaki, both of Japan

[73] Assignee: Kabushiki Kaisha Toshiba, Kawasaki, Japan

[21] Appl. No.: 900,573

[22] Filed: Jul. 25, 1997

[30] Foreign Application Priority Data

Jul. 25, 1996 [JP] Japan .................................. 8-196194
Jul. 25, 1996 [JP] Japan .................................. 8-196196
Sep. 27, 1996 [JP] Japan .................................. 8-256723

[51] Int. Cl.⁶ ..................................................... G11B 7/24
[52] U.S. Cl. ................................ 369/275.2; 430/270.13; 428/64.4
[58] Field of Search ............................. 369/275.2, 275.1, 369/288; 430/270.13, 275.1, 276.1, 278.1, 297, 495, 945, 19; 428/64.4

[56] References Cited

U.S. PATENT DOCUMENTS

| | | | |
|---|---|---|---|
| 4,548,889 | 10/1985 | Nemoto et al. | 430/273 |
| 4,969,141 | 11/1990 | Takaoka et al. | 369/100 |
| 5,420,845 | 5/1995 | Maeda et al. | 369/275.1 |
| 5,431,978 | 7/1995 | Nakamura et al. | 428/64.6 |
| 5,484,686 | 1/1996 | Maeda et al. | 430/270.13 |
| 5,523,140 | 6/1996 | Tominaga et al. | 369/288 |

OTHER PUBLICATIONS

Doremus: "Optical Properties of Thin Metallic Films in Island Form", Journal of Applied Physics, vol. 37, No. 7, Jun. 1966, pp. 2775–2781.

*Primary Examiner*—Tan Dinh
*Attorney, Agent, or Firm*—Pillsbury Madison & Sutro LLP

[57] ABSTRACT

A phase change optical recording medium having a structure that a phase change optical recording layer and other layers are stacked, wherein the optical recording layer has a microstructure that particles of optical recording material are dispersed in a matrix made from a dielectric, and wherein the optical recording layer meets the condition of $Ama < Amc$ with respect to Maxwell Garnett absorption, where $Ama$ and $Amc$ are the magnitude of Maxwell Garnett absorption of the optical recording layer in the case where the particles are amorphous and crystalline, respectively, so that the optical recording layer meets the condition of $Aa^* \leq Ac^*$ with respect to effective absorbance, where $Aa^*$ and $Ac^*$ are the effective absorbance of the optical recording layer in the case where the particles are amorphous and crystalline, respectively.

17 Claims, 3 Drawing Sheets

PHASE CHANGE OPTICAL RECORDING MEDIUM

BACKGROUND OF THE INVENTION

The present invention relates to a phase change optical recording medium for recording and reproducing information by irradiating the medium with a light beam.

A phase change optical recording medium, in which recording and reproduction are carried out by irradiating the medium with a light beam, has advantages of large capacity, high-speed access and medium portability. As the recording density of the medium increases, the field of application thereof is expected to be broadened. The operation of the phase change optical recording medium is as follows. In recording, an optical recording layer in a crystalline state is irradiated with a light beam of a recording power level to heat the recording site up to a temperature above the melting point thereof, and then the irradiated site is rapidly cooled in a short period of time less than the crystallization time, thereby forming an amorphous recording mark. In this case, overwriting can be performed by light intensity modulation. The recorded information is readout by utilizing the difference in the reflectance between the crystalline region and the amorphous recording mark.

Figure 1:
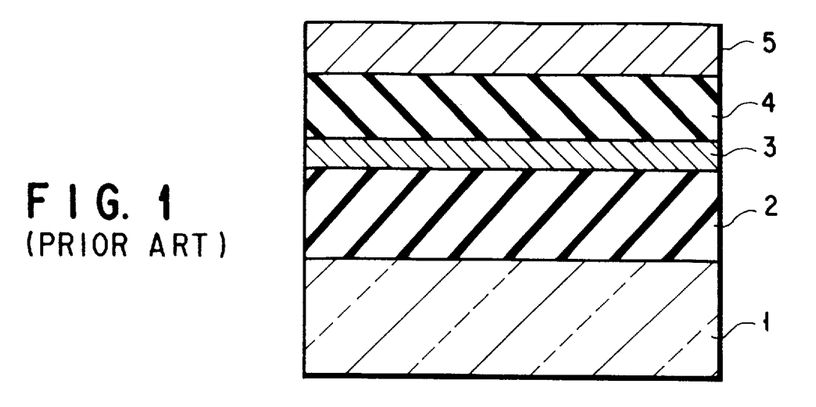
FIG. 1 is a sectional view of a conventional phase change optical recording medium.

In order to obtain a satisfactory overwrite performance (including Γ characteristics and overwrite repeatability), the phase change optical recording medium should preferably have a stacked structure which allows rapid heating and rapid cooling. FIG. 1 shows a typical structure of a conventional phase change optical recording medium which is now in practical use. As shown in FIG. 1, on a substrate 1, there are formed a first interference layer (lower protective layer) 2 made from a relatively thick dielectric having a thickness of 100 to 200 nm, a thin optical recording layer 3 having a thickness of 10 to 30 nm, a second interference layer (upper protective layer) 4 made from a relatively thin dielectric having a thickness of 10 to 40 nm and a reflective layer 5 made from a relatively thick and highly thermal conductive metal having a thickness of 50 to 100 nm.

As a technique which further enhances the recording density of the phase change optical recording medium, pulse width modulation recording (mark-edge detection) and land-groove (L-G) recording are known. The pulse width modulation recording makes it possible to reduce bit pitch by recording data in the edges of recording marks. According to this method, the recording density can be about 1.5 times that of conventional mark position recording. In the land-groove recording, the depth of groove is set to about ⅙ of the laser wavelength so as to reduce cross talk, which allows to record data on both land and groove. According to the L-G recording, the recording density can be about twice that of the conventional method in which data is recorded only in either land or groove.

In the L-G recording, it is required to suppress cross erase, i.e., a phenomenon that the recording mark edges in adjacent tracks are erased. Since the optical recording medium of FIG. 1 has a stacked structure capable of rapid heating and cooling, which effectively suppresses cross erase, there is little trouble in so far as the L-G recording is concerned. Meanwhile, in order to attain the pulse width modulation recording, it is required to minimize fluctuation in mark edge position. However, since the structure of FIG. 1 is likely to cause fluctuation in mark edge position, the pulse width recording is hard to realize. The reason is explained as follows. As to the recording layer alone, the reflectance of an amorphous region is smaller than that of a crystalline region. Besides, in the structure of FIG. 1, light passed through the recording layer is totally reflected by the uppermost reflective layer 5 and returned to the recording layer 3. Taking these conditions into consideration, the effective absorbance (A*) of the recording layer, which is observed from the incident side of light beam, is greater in the amorphous region (Aa*) than in the crystalline region (Ac*). It is problematic to carry out overwriting under the condition of Aa*>Ac*. That is, since the crystalline region is slowly heated up due to the smaller absorption and also requires a latent heat of melting, the region is hard to melt relative to the amorphous region. Therefore, the size of recording mark to be newly formed differs depending on whether the overwritten site is crystalline or amorphous, which means the fluctuation in mark edge position becomes greater.

Accordingly, in order to attain the pulse width modulation recording by suppressing the fluctuation in mark edge position upon overwriting, it has been found desirable that the condition of Aa*≦Ac* be met. Under the circumstances, optical recording media having an improved stacked structure so as to satisfy the above condition have been proposed as follows.

(1) A stacked structure similar to that of FIG. 1 except that the uppermost reflective layer is replaced with a semitransparent layer: See, for example, ISOM/ODS-joint international conference proceeding, pp.71 (Th.3.5). This stacked structure meets the condition of Aa*≦Ac* by allowing a part of light to transmit through the semitransparent layer.

(2) A stacked structure in which a semi-transparent layer is inserted between the substrate and the first interference layer in addition to that of FIG. 1: See, for example, U.S. Pat. No. 5,431,978. This stacked structure realizes the condition of Aa*≦Ac* by utilizing interference of light.

In the above optical recording media, however, the semi-transparent layer reduces heat radiation, which makes thermal response slow. As a result, overwrite repeatability is deteriorated due to increase in thermal load on the recording layer as well as the land-groove recording characteristics is deteriorated due to increase in cross erase.

As stated above, it has been difficult for conventional optical recording media to meet excellent overwrite repeatability and land-groove recording as well as excellent pulse width modulation recording.

BRIEF SUMMARY OF THE INVENTION

An object of the present invention is to provide a phase change optical recording medium which represents superior overwrite repeatability and land-groove recording characteristics and which is suitable to pulse width modulation recording.

According to an aspect of the present invention, there is provided a phase change optical recording medium having a structure that a phase change optical recording layer which transits between two states of a crystalline state and an amorphous state when irradiated with light and other layers are stacked, wherein the optical recording layer has a micro-structure that particles of optical recording material are dispersed in a matrix made from a dielectric, and wherein the optical recording layer meets the condition of Ama<Amc with respect to Maxwell Garnett absorption, where Ama and Amc are the magnitude of Maxwell Garnett absorption of the optical recording layer in the case where the particles are amorphous and crystalline, respectively, so that the optical recording layer meets the condition of Aa*≦Ac* with respect to effective absorbance, where Aa* and Ac* are the effective absorbance of the optical recording layer in the case where the particles are amorphous and crystalline, respectively.

According to another aspect of the present invention, there is provided a phase change optical recording medium having a structure that a phase change optical recording layer which transits between two states of a crystalline state and an amorphous state when irradiated with light and other layers are stacked so that the optical recording layer meets the condition of Aa*≦Ac* with respect to effective absorbance, where Aa* and Ac* are the effective absorbance of the optical recording layer in the case where the optical recording material is amorphous and crystalline, respectively, wherein the optical recording layer has a microstructure that particles of optical recording material are dispersed in a matrix made from a dielectric, and wherein the size of the particles are smaller than the size of light spot.

In the optical recording medium according to the present invention, the thermal conductivity of the matrix is preferably smaller than that of the optical recording material.

In the present invention, the "effective" absorbance means the absorbance which is actually measured when the optical recording layer in the optical recording medium having a stacked structure is viewed from the incident side of light beam.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention is described in detail below.

An embodiment of the phase change optical recording medium of the present invention has a stacked structure that a phase change optical recording layer and other layers such as an interference layer and reflective layer, and further the optical recording layer has a particle dispersion type microstructure whose Maxwell Garnett absorption is adjusted.

The optical recording layer constituting the phase change optical recording medium according to the present invention has a structure that particles of phase change optical recording material are dispersed in a matrix made from a dielectric.

As the phase change optical recording material, used is a material which transits reversibly between a crystalline state and an amorphous state and whose optical properties differ between the two states. Examples of the material include GeSbTe, InSbTe, AgInSbTe, SnSeTe, GeTeSn and InSeTlCo.

The material for the matrix made from a dielectric for making disperse the particles of the optical recording material may be selected from the group consisting of inorganic materials such as an oxide, a nitride, a carbide and a boride, and organic polymers. Examples of the inorganic materials include Si—O, Al—O, Zr—O, Si—N, B—N and Si—C. These inorganic materials do not necessarily have a stoichiometric composition. Examples of the organic polymers include polytetrafluoroethylene (PTFE) and hydrocarbon polymers.

Next, Maxwell Garnett absorption is explained below. It is known that, in a film comprising metal particles or island-like metal, absorption occurs at a specific wavelength which is determined by such parameters as the material, sizes and volume content of the particles and optical constants of the matrix in which the particles are dispersed. This absorption is called Maxwell Garnett absorption. The present inventors have formed a phase change optical recording layer having a structure that particles of optical recording material are dispersed in a dielectric matrix, and have examined the Maxwell Garnett absorption at operating wavelength of the optical recording medium. As a result, they have found that, if such parameters as the sizes and volume content of the particles and optical constants of the matrix are properly set, the magnitude of Maxwell Garnett absorption can be controlled so as to meet the condition of Ama<Amc, where Ama is Maxwell Garnett absorption in the case where the particles are amorphous and Amc is that in the case where the particles are crystalline. Further, they have found that, even if the media has a stacked structure suitable to rapid heating and cooling, if the Maxwell Garnett absorption is so adjusted as to meet the condition of Ama<Amc, effective absorbance of the optical recording layer can be controlled so as to meet the condition of Aa*≦Ac*, where Aa* is effective absorbance of the optical recording layer in the case where the particles are amorphous and Ac* is that in the case where the particles are crystalline.

Accordingly, an optical recording medium having the above-described structure is most suitable to a high-density recording, because such a medium not only brings about superior overwrite repeatability and cross erase characteristics owing to the stacked structure suitable to rapid heating and quenching but also realizes the pulse width modulation recording owing to the condition of Aa*≦Ac*.

The theoretically required conditions to control the Maxwell Garnett absorption (Am) in the optical recording layer so as to meet the condition of Ama<Amc at the operating wavelength of the medium, can be obtained in the following way.

Suppose the case where on a substrate having a refractive index of $n_s$, there is formed a particle dispersion film having a thickness d and an imaginary part of $\epsilon_2^*$ of a complex dielectric constant. The Maxwell Garnett absorption Am to the incident light irradiated perpendicularly into the dispersion film is approximately given by the following equation (i), where no interfacial reflection is taken into consideration:

$$Am = 1 - e^{-\alpha d} \qquad (i)$$

$$\alpha = \frac{2\pi n_s \epsilon_2^*}{\lambda}$$

Further, $\epsilon_2^*$ is given by the following equation (ii).

$$\epsilon_2^* = \frac{9\epsilon_2 \epsilon_m Q}{(1-Q)^2 \left\{ \epsilon_1 + \epsilon_m \left( \frac{2+Q}{1-Q} \right)^2 + \epsilon_2^2 \right\}} \qquad (ii)$$

In the above equation, Q is a volume content of the particles, which is given by Q=VNv where V is a volume of a particle and Nv is a density by number of particles in the dispersion film. $\epsilon_1$ and $\epsilon_2$ are a real part and an imaginary part, respectively, of the complex dielectric constant of the optical recording material. $\epsilon_m$ is a dielectric constant of the matrix material for dispersing the particles. Since a transparent dielectric is basically used for the matrix material, only the real part $\epsilon_m$ is considered. In the equation (ii), although it is assumed that the particles have a spherical shape, Am may be theoretically expressed by an equation even in the case where the particles are not spherical by giving some modification to the equation (ii).

Since each of $\epsilon_1$, $\epsilon_2$ and $\epsilon_m$ is a function of wavelength, each of $\epsilon_2^*$ and Am is also a function of wavelength. Ama, which is the magnitude of the Maxwell Garnett absorption in the case where the particles are amorphous, is obtained by substituting the real part $\epsilon_{1a}$ and imaginary part $\epsilon_{2a}$ of the complex dielectric constant of the amorphous region for $\epsilon_1$ and $\epsilon_2$, respectively. Meanwhile, Amc, which is the magnitude of the Maxwell Garnett absorption in the case where the particles are crystalline, is obtained by substituting the real part $\epsilon_{1c}$ and imaginary part $\epsilon_{2c}$ of the complex dielectric constant of the crystalline region for $\epsilon_1$ and $\epsilon_2$, respectively. Accordingly, by appropriately selecting the sizes and the density by number of the particles and the material for the matrix, it is possible to fulfill the requirement for Ama<Amc.

By taking into consideration the fact that the optical recording material is nonmagnetic, the complex dielectric constant $\epsilon$ can be linked to a refractive index n and an extinction coefficient k by the following equations.

$$n^2 - k^2 = \epsilon/\epsilon_0$$

$$nk\upsilon = \sigma/4\pi\epsilon_0$$

where $\epsilon$ is a dielectric constant of the dispersion type optical recording layer, $\epsilon_0$ is the dielectric constant of vacuum, $\upsilon$ is a wavenumber ($\upsilon = c/\lambda$, where c is light velocity and $\lambda$ is a wavelength), and $\sigma$ is an electric conductivity of the dispersion type optical recording layer.

To be more specific, the parameters of the dispersion type optical recording layer, required to meet the above-described conditions, are explained below in the case where GeSbTe is used as a phase change optical recording material. In the case of GeSbTe, the optical constants in an amorphous state are given as n=4.36 and k=1.72, while the optical constants in a crystalline state are given as n=4.46 and k=4.00. Therefore, the requirement for Ama<Amc can be fulfilled, if the parameters are set as follows: the refractive index of the matrix n=1.4–3.0; the size of the GeSbTe particles is 1–20 nm; and the volume content of the particles is 25–85 vol %. If the optical recording material and the matrix material are changed, the optimal volume content and size of the particles will also be changed.

Another embodiment of the phase change optical recording medium of the present invention has a structure that a phase change optical recording layer and other layers such as an interference layer and a reflective layer are stacked so that the condition of Aa*≦Ac* is fulfilled in which a dispersion type optical recording layer is used.

In order to prevent the scattering of light by the particles of the layer, the size of the particles to be dispersed in a matrix of the optical recording layer are designed to be sufficiently smaller than the spot size of the laser beam (normally in the order of submicrons) to be irradiated upon recording. Preferably, the size of the particles are in the range of 10 to 100 nm, more preferably 20 to 50 nm. The spacing between the particles, i.e., the thickness of the matrix present between the particles, is preferably in the range of 1 to 10 nm. If the particle spacing is less than 1 nm, deterioration of the optical recording material by mass transfer is likely to occur. If the particle spacing is greater than 10 nm, a sufficient reflectance cannot be obtained.

Examples of the optical recording medium having a stacked structure that fulfills the requirement for Aa*≦Ac*, include: (1) a structure having a substrate, and a first interference layer, a dispersion type optical recording layer, a second interference layer and a semitransparent layer formed in this order on the substrate; and (2) a structure having a substrate, and a semitransparent layer, a first interference layer, a dispersion type optical recording layer, a second interference layer and a reflective layer formed in this order on the substrate.

In the present invention, it is preferable that the thermal conductivity of the matrix be lower than that of the optical recording material. This is for the purpose of diminishing the heat transfer in in-plane directions to reduce the cross erase. The thermal conductivity of the matrix is preferably 0.5 W/mK or less. The practical range is 0.1 to 0.5 W/mK.

A preferred example of the matrix having a lower thermal conductivity is a porous inorganic material or an organic polymer. An organic polymer is particularly preferable, because many of the organic polymers have a thermal conductivity lower than that of the optical recording material, and therefore the matrix material can be selected from a variety of species.

Examples of the matrix, which is made from a porous inorganic material, include oxides, nitrides, carbides, borides, sulfides and fluorides, each having fine pores of in a range of several to tens of angstroms in size. Specific examples are Si—O, Al—O, Zr—O, Si—N, B—N and Si—C. Generally, these inorganic compounds in a bulk state have a thermal conductivity higher than that of an optical recording material. However, the thermal conductivity of these compounds in a porous state are lower than that of the optical recording material, because of the presence of the fine pores. Such a porous material can be prepared by deposition in gas or by bias sputtering under a relatively high pressure of an inorganic compound.

The matrix made from an organic polymer can be obtained by plasma polymerization of a hydrocarbon or fluorocarbon gas, or by reactive sputtering or reactive deposition of carbon in a hydrogen or in a fluorine-based gas, or otherwise by sputtering or deposition of polytetrafluoroethylene.

Other materials for use in the phase change optical recording medium according to the present invention are described below.

Examples of the materials for the substrate include polycarbonate and polymethyl methacrylate (PMMA). A groove for tracking guide is formed on the surface of the substrate. Various films are stacked onto the surface of the substrate on which the groove is formed.

Examples of the materials for the first interference layer (lower protective layer) and the second interference layer (upper protective layer) include oxides, nitrides, carbides, borides, sulfides, fluorides and mixtures thereof. Typical materials are ZnS—SiO$_2$, Ta$_2$O$_5$ and the like.

Examples of the materials for the semitransparent layer include a metal, such as Al, Au and Cu, and an alloy containing these elements which is formed into a thin film so that the translucency is exhibited. In addition, a material such as Si which transmits light even at a thick film can also be used.

Examples of the materials for the reflective layer include a metal, such as Al, Au and Cu, and an alloy containing these elements which material is formed into a thick film so that the light transmission inhibited.

In the phase change optical recording medium according to the present invention, a counter substrate which is made from the same material as that for the substrate, may be bonded to the uppermost layer in order to prevent a bend of the substrate and stabilize the recording and readout operations. As the bonding layer, for example, an ultraviolet light-curable resin may be used.

Note that, Jpn. Pat. Nos. 1,709,012 and 1,847,417 disclose a phase change optical recording layer having a structure that particles of optical recording material are dispersed in a oxide ceramic matrix. However, the main purpose of the structure is to prevent the oxidation of the optical recording material and thereby to prolong the life of the medium. These patents make no reference to the Maxwell Garnett absorption. Naturally, unlike the description of the present invention, these patents make no mention of selecting the size and volume content of the particles along with the optical constants of the matrix so that the relationship of the Maxwell Garnett absorption as specified in the present invention is fulfilled. In addition, the optical recording media of the above-mentioned patents have a stacked structure which does not fulfill the requirement for Aa*≦Ac*. Therefore, the effect of the present invention obtained by using a dispersion type optical recording layer for a stacked structure which fulfills the requirement for Aa*≦Ac*, is not obvious from the descriptions of the above-mentioned patents.

EXAMPLES

Example 1

Figure 2:
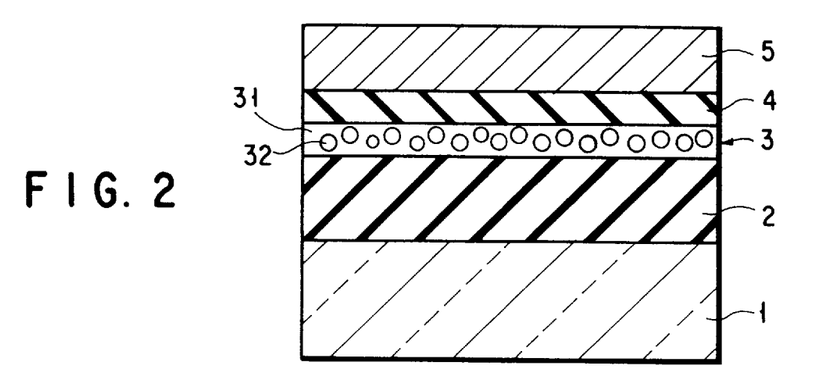
FIG. 2 is a sectional view of the phase change optical recording medium according to Example 1.

FIG. 2 is a sectional view of the phase change optical recording medium according to Example 1. On a polycarbonate substrate 1, there are formed in succession, a 150 nm-thick first interference layer 2 made from ZnS—SiO$_2$, a 20 nm-thick phase change optical recording layer 3 having a microstructure that GeSbTe particles 32 are dispersed in a TiO$_2$ matrix (refractive index n=2.2) 31, a 20 nm-thick second interference layer 4 made from ZnS—SiO$_2$, and a 50 nm-thick reflective layer 5 made from AlMo. The stacked structure enables rapid heating and cooling as in the case of a conventional medium having the structure shown in FIG. 1.

The phase change optical recording medium is manufactured in the following way. A groove for tracking guide is formed on the polycarbonate substrate. The depth of the groove is about ⅙ of the laser wavelength (680 nm) for recording and readout so as to be suitable to land-groove recording. The polycarbonate substrate is subjected to dehydration, and then placed in a multi-chambered sputtering apparatus followed by evacuating the apparatus. Next, the predetermined materials are sputtered in succession to form films on the substrate. The first interference layer 2 is formed by RF sputtering in a sputtering chamber provided with a Zn—SiO$_2$ target. Then, the recording layer 3 is formed by binary RF bias cosputtering in a sputtering chamber provided with a GeSbTe target and a Zn—SiO$_2$ target. The second interference layer 4 is then formed by RF sputtering in a sputtering chamber provided with a Zn—SiO$_2$ target. Finally, the reflective layer 5 is formed by DC sputtering in a sputtering chamber provided with an AlMo target.

The GeSbTe particle content by volume of the recording layer 3 can be controlled by the power ratio applied to the targets at the time of the binary cosputtering. The particle size of the GeSbTe particles can be controlled by the bias power applied to the substrate.

In this example, on the basis of the calculation according to the Maxwell Garnett absorption theory, the power ratio applied to targets and the bias power applied to the substrate are controlled so that the GeSbTe particle content by volume of the recording layer 3 is set to be 71 vol % and the average particle size is set to be 15 nm.

Figure 3:
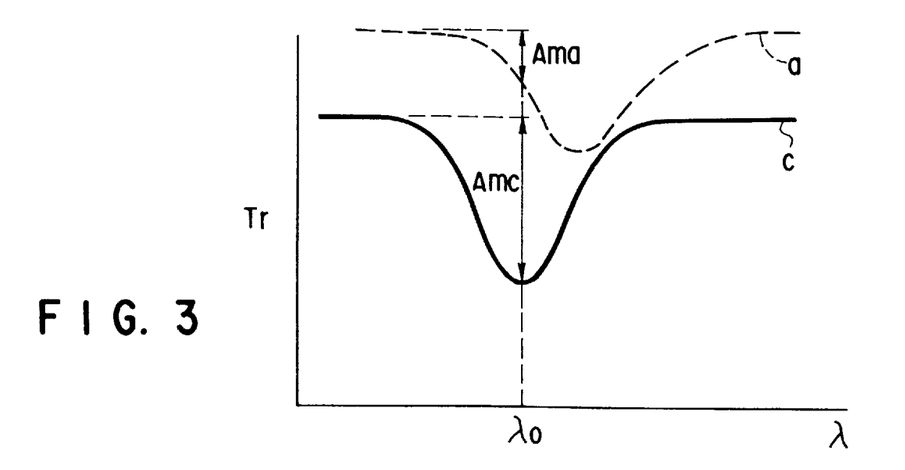
FIG. 3 shows the wavelength dependency of the transmittance of the optical recording layer constituting the optical recording media of Example 1.

In order to measure the transmittance of the recording layer, the recording layer alone is formed on a glass substrate by the same condition as described above. FIG. 3 shows the dependency of the transmittance (Tr) on wavelength (λ). In FIG. 3, the curve (a) refers to the transmittance of the as-deposited amorphous recording layer, while the curve (c) refers to the transmittance of the recording layer crystallized by heating the as-deposited recording layer.

In FIG. 3, the Maxwell Garnett absorption has occurred at the wavelength ($\lambda_0$) at which the transmittance drops. $\lambda_0$ is the laser wavelength at which the disk is actually operated. For example, the wavelength is nearly 650 nm for DVD having a capacity of about 5 GB for one side. Since the GeSbTe particle content by volume of the recording layer and the particle size of the GeSbTe particles are controlled in the above-described manner, the Maxwell Garnett absorption at $\lambda_0$ is controlled so that the value Ama in the case where the GeSbTe particles are in the amorphous state is smaller than the value Amc in the case where the GeSbTe particles are in a crystalline state.

In the wavelength range other than the wavelength range at which the Maxwell Garnett absorption is observed, the transmittance is kept at a nearly constant value such that the transmittance for an amorphous state is higher than that for a crystalline state. This indicates the characteristics inherent to GeSbTe. As shown in FIG. 3, since the requirement for Ama<Amc is fulfilled, the requirement for Aa*≦Ac* can be fulfilled in the stacked structure shown in FIG. 2.

Two prior art optical recording media (Comparative Examples 1a and 1b) are prepared in order to compare the characteristics with those of the optical recording medium of Example 1 shown in FIG. 2.

Comparative Example 1a corresponds to the optical recording medium having the structure shown in FIG. 1. That is, on a polycarbonate substrate 1, there are formed in succession, a 150 nm-thick first interference layer 2 made from ZnS—SiO$_2$, a 20 nm-thick optical recording layer 3 made from GeSbTe, a 20 nm-thick second interference layer 4 made from ZnS—SiO$_2$, and a 50 nm-thick reflective layer 5 made from Au.

Comparative Example 1b is an optical recording medium having a semitransparent layer in place of the reflective layer of FIG. 1. That is, on a polycarbonate substrate 1, there are formed in succession, a 200 nm-thick first interference layer 2 made from ZnS—SiO$_2$, a 10 nm-thick optical recording layer 3 made from GeSbTe, a 20 nm-thick second interference layer 4 made from ZnS—SiO$_2$, and a 50 nm-thick semitransparent layer 5 made from Si. As the absorbance is adjusted by use of the semitransparent layer, the requirement for Aa*≦Ac* is fulfilled.

As in Example 1, the wavelength dependency of the transmittance of the optical recording layers of Comparative Examples 1a and 1b is examined. However, the Maxwell Garnett absorption is not observed and the transmittance is nearly constant for both amorphous state and crystalline state. The relationship between the effective absorbance (Aa*) in the amorphous state and the effective absorbance (Ac*) in the crystalline state for each optical recording layer is Aa*>Ac* for Comparative Example 1a, and Aa*<Ac* for Comparative Example 1b.

Figure 4:
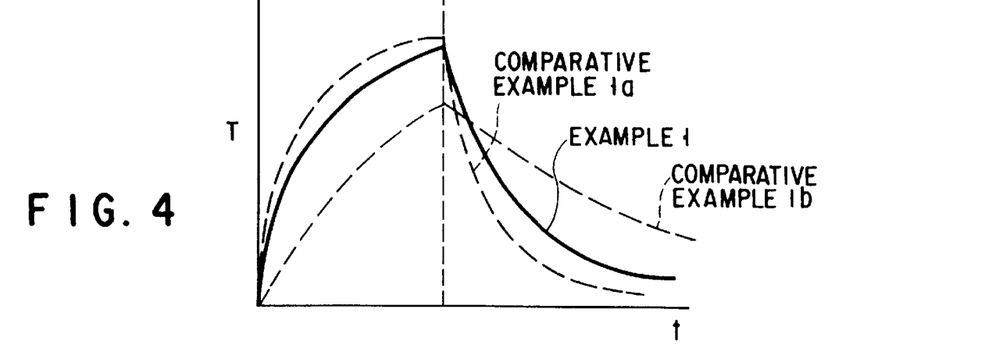
FIG. 4 illustrates thermal response characteristics of the optical recording medium of Example 1 and Comparative Examples 1a and 1b.

The thermal response of optical recording media of Example 1 and Comparative Examples 1a and 1b is evaluated by numerical calculation. The thermal constants used for the calculation are measured by a optical AC current method. FIG. 4 shows the dependency of temperature (T) of the recording layer on the time (t). The steeper, the more preferable the thermal response is, since the durability in repeated overwriting is improved and the cross erase is reduced. As is shown in FIG. 4, the medium of Comparative Example 1a has the steepest thermal response. Although the medium of Example 1 is somewhat inferior to the medium of Comparative Example 1a in the steepness of thermal response, the thermal response of the medium of Example 1 is good. These media are markedly superior to the medium of Comparative Example 1b.

Further, after the initial crystallization by means of a bulk eraser is carried out, the disk characteristics of the optical recording media of Example 1 and Comparative Examples 1a and 1b are evaluated in the following way. In this evaluation, a testing apparatus provided with a semiconductor laser having a wavelength of 650 nm and an object lens having NA of 0.6 is used. In the test, the linear speed of the disk is changed in a rang from 5 to 30 m/s and the power for recording and readout is optimized depending on the linear speed.

(1) High-density recording characteristics

After overwriting random patterns several times, the jitter (as a ratio to the window width) is measured.

(2) Cross erase characteristics

As to specific three tracks (groove/land/groove), the following test is conducted for evaluation. First, a signal is recorded on the central track and then the signal is readout to measure the C/N ratio. Next, after random patterns have been overwritten several times on the two tracks beside the central track, the signal of the central track is again readout to measure the C/N ratio. In this way, the percentage reduction in C/N ratio is determined.

(3) Overwrite performance

Random patterns are repeatedly overwritten to determine the number of repeated overwriting at which the jitter exceeds 12.8% (corresponding to a bit error rate of 10$^{-4}$).

These results are shown in Table 1.

TABLE 1

|  | Jitter (%) | Cross Erase (dB) | Number of repeated overwriting |
| --- | --- | --- | --- |
| Example 1 | 6 | −0.5 | 10$^6$ |
| Comparative example 1a | 12 | −0.5 | 10$^6$ |
| Comparative example 1b | 6 | −1.5 | 10$^5$ |

The following conclusion can be drawn from Table 1. The disk of Comparative Example 1a has a high jitter and is inferior in the high-density recording characteristics, although it is superior in the cross erase characteristics and overwrite performance owing to good thermal response. The disk of Comparative Example 1b is inferior in cross erase characteristics and exhibits an inferior overwrite performance due to slow thermal response, although it has a superior high-density recording characteristic because its absorbance is properly controlled. In contrast with these disks, the disk of Example 1 is superior to these disks in any of the characteristics, namely, the high density recording, cross erase characteristics and overwrite performance. This is because the disk of Example 1 fulfills the requirement for Aa*<Ac* with regard to the absorbance, while maintaining the steep thermal response.

Example 2

Figure 5:
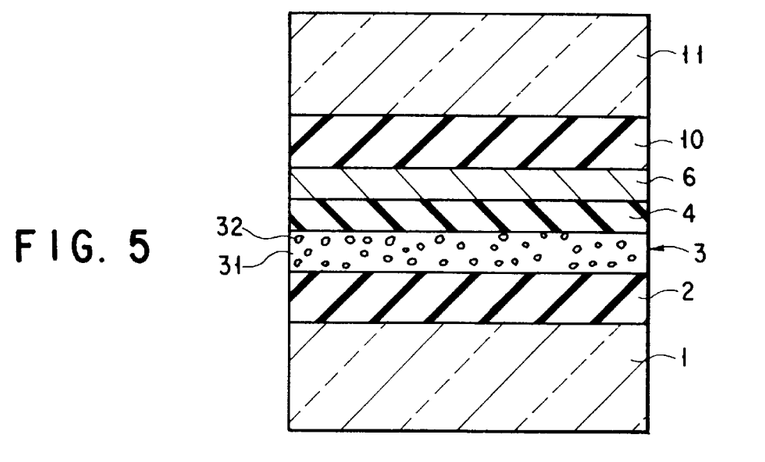
FIG. 5 is a sectional view of the optical recording media according to Examples 2a and 2b.
Figure 6:
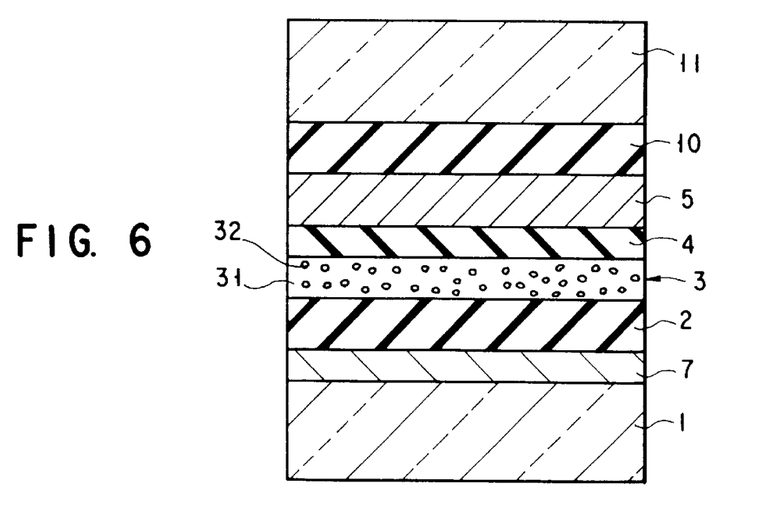
FIG. 6 is a sectional view of the optical recording media according to Examples 2c and 2d.
Figure 7:
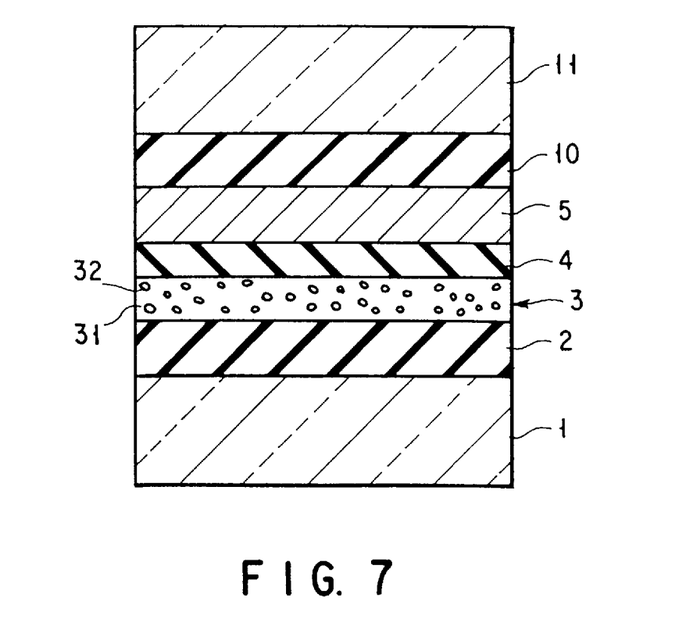
FIG. 7 is a sectional view of the optical recording media according to Comparative Examples 2a and 2d.

FIG. 5 is a sectional view of the phase change optical recording media according to Examples 2a and 2b. FIG. 6 is a sectional view of the phase change optical recording media according to Examples 2c and 2d. FIG. 7 is a sectional view of the phase change optical recording media according to Comparative Examples 2a and 2b.

Each of these optical recording media comprises a polycarbonate substrate 1 and layers formed thereon in succession. The polycarbonate substrate is provided with a groove having a depth of about ⅙ of the laser wavelength (680 nm). The track pitch is controlled within a range of 0.6 to 0.8 μm.

The optical recording layer 3 has a microstructure that GeSbTe particles 32 are dispersed in a ZnS—SiO$_2$ matrix 31 (dispersion film X), or GeSbTe particles 32 are dispersed in a SiN matrix 31 (dispersion film Y). These optical recording layers are formed by co-sputtering the targets of the matrix material and the optical recording material.

The optical recording medium of FIG. 5 has a structure that on a polycarbonate substrate 1, there are formed in succession, a 90 nm-thick first interference layer 2 made from ZnS—SiO$_2$, a 50 nm-thick dispersion type optical recording layer 3, a 120 nm-thick second interference layer 4 made from ZnS—SiO$_2$, and a 10 nm-thick upper semitransparent layer 6 made from Au. In addition, a counter substrate 11 made from polycarbonate is bonded to the upper semitransparent layer 5 by means of an adhesive layer 10.

The optical recording medium of FIG. 6 has a structure that on a polycarbonate substrate 1, there are formed in succession, a 10 nm-thick lower semitransparent layer 7 made from Au, a 140 nm-thick first interference layer 2 made from ZnS—SiO$_2$, a 20 nm-thick dispersion type optical recording layer 3, a 120 nm-thick second interference layer 4 made from ZnS—SiO$_2$, and a 100 nm-thick reflective layer 5 made from an AlTi alloy. In addition, a counter substrate 11 made from polycarbonate is bonded to the reflective layer 5 by means of an adhesive layer 10.

The optical recording medium of FIG. 7 has a structure that on a polycarbonate substrate 1, there are formed in succession, a 150 nm-thick first interference layer 2 made from ZnS—SiO$_2$, a 20 nm-thick dispersion type optical recording layer 3, a 25 nm-thick second interference layer 4 made from ZnS—SiO$_2$, and a 100 nm-thick reflective layer 5 from an AlTi alloy. In addition, a counter substrate 11 made from polycarbonate is bonded to the reflective layer 5 by means of an adhesive layer 10.

The stacked structure of the optical recording medium of FIG. 7 does not fulfill the requirement for Aa*<Ac*. In the dispersion type optical recording layer of FIG. 7, the wavelength range at which Maxwell Garnett absorption is observed is set at a wavelength range not containing an operating wavelength. Therefore, although the optical recording layer of FIG. 7 is of dispersion type, the effective absorption is under the condition of Aa*>Ac* at the operating wavelength.

Further, optical recording media of Comparative Examples 2c–2e having a similar stacked structures shown in FIGS. 5–7, respectively, but each of which has an optical recording layer composed of a GeSbTe continuous film.

First, the microstructure of the dispersion-type optical recording layer is observed under a high-resolution TEM. The GeSbTe particles are nearly spherical and have an average size in the range of 30±10 nm by half width of the distribution. The spacing between the nearest particles is about 1 nm. The GeSbTe particle content by volume of the optical recording layer is about 50%.

In comparison with the thermal conductivity of GeSbTe (about 0.6 W/mK) as the optical recording material, ZnS—SiO$_2$ has a lower thermal conductivity and SiN has a higher thermal conductivity.

Using a thermal conductivity measuring apparatus by means of an optical AC current method, the thermal conductivity of the optical recording layer is measured. As a result, the thermal conductivity of GeSbTe particles/ZnS—SiO$_2$ (dispersion film X) is about 0.5 W/mK and that of GeSbTe particles/SiN (dispersion film Y) is about 1.1 W/mK.

Further, after the initial crystallization by means of a bulk eraser is carried out, the disk characteristics of the optical recording media are evaluated in the following way. In this evaluation, a testing apparatus provided with a semiconductor laser having a wavelength of 650 nm and an object lens having NA of 0.6 is used. The spot size of the laser beam on the surface of the media is about 0.5 μm at full width at half maximum (FWHM). The rotation of the disk is set to 2,400 rpm and the recording is made at a position on a radius of 40 nm. In the test, the linear speed of the disk is about 10 m/s. The recording frequency is set to 3 MHz (corresponding to mark length of 1.66 μm) or to 8 MHz (corresponding to mark length of 0.63 μm).

(1) Pulse width modulation recording characteristics

After overwriting several times, the amount of jitter is measured.

(2) Land/groove recording characteristics

As to specific three tracks (groove/land/groove), the following test is conducted for evaluation. First, a signal is recorded at a frequency of 8 MHz on the central track and then the signal is readout to measure the C/N ratio. Next, after a signal have been recorded at a frequency of 3 MHz on the two tracks beside the central track, the signal of the central track is again readout to measure the C/N ratio. Tests by the above-described procedure are conducted at a plurality of positions having different track widths to determine a track width at which the C/N ratio begins to decrease due to cross erase.

(3) Overwrite performance

A single track is repeatedly overwritten by use of two recording frequencies to determine the number of repeated overwriting at which the C/N ratio begins to decrease.

The results are shown in Table 2.

TABLE 2

| | Stacked structure | Phase change optical recording layer | Jitter (ns) | L-D Recording characteristics-track width (μm) | Number of repeated overwriting |
|---|---|---|---|---|---|
| Example 2a | FIG. 5 | Dispersion film X | 2 | 0.6 | >5 × 10$^5$ |
| Example 2b | FIG. 5 | Dispersion film Y | 2 | 0.7 | >5 × 10$^5$ |
| Example 2c | FIG. 6 | Dispersion film X | 2 | 0.6 | >5 × 10$^5$ |
| Example 2d | FIG. 6 | Dispersion film Y | 2 | 0.7 | >5 × 10$^5$ |
| Comparative example 2a | FIG. 7 | Dispersion film X | 4 | 0.6 | >5 × 10$^5$ |
| Comparative example 2b | FIG. 7 | Dispersion film Y | 4 | 0.7 | >5 × 10$^5$ |
| Comparative example 2c | FIG. 5 | Continuous film | 3 | 0.65 | 10$^4$ |
| Comparative example 2d | FIG. 6 | Continuous film | 3 | 0.65 | 10$^4$ |
| Comparative example 2e | FIG.7 | Continuous film | 6 | 0.62 | 10$^5$ |

The following conclusion can be drawn from Table 2. The Comparative Examples 2a and 2b are inferior in the pulse width modulation recording characteristics, because the stacked structures of these optical recording media do not fulfill the requirement for Aa*<Ac*. The Comparative Examples 2c and 2d are slightly inferior in the pulse width modulation recording characteristics and are markedly inferior in overwrite performance, because the optical recording layers of these optical recording media are made from a GeSbTe continuous film. Comparative Example 2e is markedly inferior in pulse width modulation recording characteristics and is also inferior in overwrite performance. In contrast with these Comparative Examples, Examples 2a–2d are superior in any of the characteristics, namely, pulse width modulation recording, land-groove recording and overwriting.

The optical recording media having a dispersion-type optical recording layer are superior to the media having optical recording layers made from a continuous film in overwrite characteristics. This is because the particles of the recording material are enclosed in a stable matrix, which inhibits deterioration due to the mass transfer of the optical recording material.

The optical recording media of Examples 2a–2d exhibit similar pulse width modulation recording characteristics and overwrite performance. Examples 2a and 2c, each employing the dispersion film X, are superior to Examples 2b and 2d, each employing the dispersion film Y, in land-groove recording characteristics. This is because cross erase is reduced in Examples 2a and 2c, in which the thermal conductivity of the matrix (ZnS—SiO$_2$) is lower than that of the optical recording material (GeSbTe).

Example 3

In this Example, the thermal conductivity of the materials of various layers constituting the optical recording medium is examined. As the dispersion-type optical recording layers, there are prepared those having a microstructure that had GeSbTe particles are dispersed in a matrix made from porous $SiO_2$, PTFE and a hydrocarbon polymer, respectively. In order to examine the fine structure of the recording layer, each of the recording layers is formed on a glass substrate to a thickness of 25 nm and the surface is observed with SEM, and, after milling, the cross-section is observed by TEM.

A dispersion-type optical recording layer whose matrix is $SiO_2$ is formed in the following way. The substrate is placed in a chamber followed by evacuating, and then an Ar gas is introduced so that the pressure in the chamber is adjusted to 10 Torr. Next, the cell filled with $SiO_2$ is heated by inductive coupling and the cell filled with GeSbTe is resistance-heated so that a predetermined amount of vaporization is attained. Then, the shutter between the cells and the substrate is opened for coevaporation for a predetermined period of time to form an optical recording layer on the substrate.

In this method, the porosity of the $SiO_2$ matrix and the particle size of GeSbTe can be controlled by such parameters as the pressure, deposition rate and the distance between the cells and the substrate. As an example, an optical recording layer is prepared in which the $SiO_2$ matrix has a porosity of about 40% containing pores having a size of about 0.5 nm, and GeSbTe particles have an average particle size of about 10 nm dispersed in the matrix at a volume content of about 60%.

A dispersion-type optical recording layer whose matrix is PTFE is formed in the following way. The substrate is placed in a chamber followed by evacuating, an Ar gas is introduced so that the pressure in the chamber is adjusted to 5 mTorr. Next, a predetermined RF electric power is applied to PTFE target and GeSbTe target to carry out the sputtering for a predetermined period of time so that an optical recording layer is formed on the substrate.

In this method, the GeSbTe particle content by volume can be controlled by the power ratio applied to the targets, while the particle size of GeSbTe can be controlled by such parameters as the pressure, depositing rate and bias power to the substrate. As an example, an optical recording layer is prepared in which GeSbTe particles having an average particle size of about 15 nm are dispersed in a nonporus PTFE matrix at a volume content of about 50%.

A dispersion-type optical recording layer whose matrix is a hydrocarbon polymer is formed by chemical sputtering or by a combination of a plasma polymerization and sputtering. In the case of chemical sputtering, the sputtering of the GeSbTe target is performed in a sputtering gas containing a hydrocarbon gas such as methane. In the case of a combination of a plasma polymerization and sputtering, an inductive coupling coil is disposed in the vicinity of the substrate, and the sputtering of the GeSbTe target is performed in a sputtering gas atmosphere containing a hydrocarbon gas concurrently with the decomposition of the gas accompanied by a plasma polymerization on the substrate. As an example, an optical recording layer is prepared in which GeSbTe particles having an average particle size of about 15 nm are dispersed in a nonporous hydrocarbon polymer matrix at a volume content of about 50%.

The measured values of thermal conductivity of the materials are shown in Table 3. For the measurement, a thin film, which is made from each of the materials and has a thickness of 500 nm, is formed on a glass substrate. Then, the thermal conductivity of the films is measured by an optical AC current method.

TABLE 3

| | | Thermal conductivity (W/m · K) |
|---|---|---|
| Recording material | GeSbTe | 0.52 |
| Matrix | Porous $SiO_2$, (40% Porosity) | 0.48 |
| | Polytetrafluoroethylene (PTFE) | 0.10 |
| | Hydrocarbon polymer | 0.30 |
| | Dense $SiO_2$ | 0.82 |
| Dispersion film | GeSbTe particles/40 vol % Porous $SiO_2$ | 0.52 |
| | GeSbTe particles/50 vol % PTFE | 0.34 |
| | GeSbTe particles/50 vol % Hydrocarbon polymer | 0.43 |
| | GeSbTe particles/50 vol % dense $SiO_2$ | 0.70 |
| Protective layer | ZnS—20%$SiO_2$ | 0.60 |
| Reflective layer | Al—Ti | 46.0 |
| Semitransparent layer | Si | 168.0 |

Next, an optical recording medium having a structure shown in FIG. 7 is manufactured. The polycarbonate substrate 1 is provided with a groove having a track pitch adjusted within a range of 0.4 to 1.2 μm. On the polycarbonate substrate 1, there are formed thereon in succession, a 120 nm-thick first interference layer 2 made from ZnS—$SiO_2$, an optical recording layer 3 having a microstructure that GeSbTe particles 32 are dispersed in PTFE matrix 31 at a volume content of about 50%, a 20 nm-thick second interference layer 4 made from ZnS—$SiO_2$, and a 200 nm-thick reflective layer 5 made from an AlTi alloy. In addition, a counter substrate 11 made from polycarbonate is bonded to the reflective layer 5 by means of an adhesive layer 10.

For the purpose of comparison, there are also manufactured optical recording media having a structure similar to that shown in FIG. 7, but having an optical recording layer consisting of a GeSbTe continuous film (Comparative Example 3a), or having an optical recording layer consisting of a dispersion film in which GeSbTe particles are dispersed in a dense $SiO_2$ matrix at a volume content of about 50% (Comparative Example 3b).

Further, after the initial crystallization by means of a bulk eraser is carried out, each of the optical recording media is subjected to recording/readout tests to evaluate the disk characteristics in the following way. In this evaluation, a testing apparatus provided with a semiconductor laser having a wavelength of 650 nm and an object lens having NA of 0.6 is used. In the test, the medium is rotated at a linear speed of 10 m/s. Land-groove recording is carried out at a recording frequency of 5 MHz or 7 MHz. The recording power is 12 mW, the erasing power is 6 mW and the readout power is 1.5 mW. The spot size of the laser beam on the surface of the media is about 0.6 μm at full width at half maximum (FWHM) and the recording mark width is similar to that.

Figure 8:
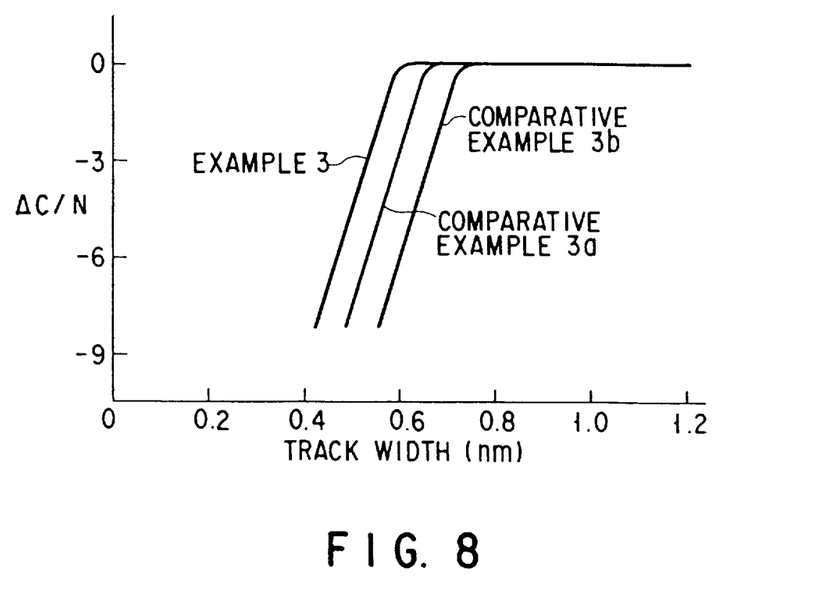
FIG. 8 illustrates the relationship between the track width and ΔC/N of the optical recording media according to Example 3 and Comparative Examples 3a and 3b.

As to specific three tracks (groove/land/groove) having a specific track width, the following test is conducted for evaluating land-groove recording characteristics. First, a signal is recorded at a frequency of 7 MHz on the centeral track and then the signal is readout to measure the C/N ratio. Next, after a signal have been recorded at a frequency of 3 MHz on the two tracks beside the centeral track, the signal of the central track is again readout to measure the C/N ratio. Tests by the above-described procedure are conducted at a plurality of positions having different track widths to determine a track width at which the C/N ratio begins to decrease due to cross erase. The results are shown in FIG. 8.

The track width, at which C/N ratio begins to decrease, of the optical recording medium of Example 3 is the smallest among the media tested, and cross erase does not occur even if the track width is narrowed to nearly a recording mark width (about 0.6 µm). The track width, at which the C/N ratio begins to decrease, becomes larger in the order of Example 3 (a GeSbTe particles/PTFE dispersion film), Comparative Example 3a (a GeSbTe continuous film) and Comparative Example 3b (a GeSbTe particles/dense $SiO_2$ dispersion film). This order coincides with the ascending order of the values of thermal conductivity as shown in Table 3. This fact supports that the cross erase is mainly caused by the diffusion of heat in the in-plane directions within the recording layer.

For the purpose of evaluating the overwrite performance, overwriting is carried out at a recording frequency of 7 MHz on a single track repeatedly to determine the number of repeated overwriting at which C/N ratio begins to decrease. As a result, it has been found that the C/N ratio begins to decrease at about 200,000 repetitions in the case of Comparative Example 3. On the other hand, even at 500,000 repetitions or more, no reduction in C/N ratio is observed in the case of Example 3 and Comparative Example 3b.

After the test, the tracks of the media are observed with an electronic microscope. In the case of Comparative Example 3a, the recording material is found to have transferred in the direction of the track. On the other hand, in the case of Example 3 and Comparative Example 3b, the observed state is the same as the initial state with no change observed. This fact indicates that mass transfer of the optical recording material is prevented by the matrix in the case of a dispersion-type optical recording layer.

Example 4

An optical recording medium having a structure shown in FIG. 6 is prepared. The polycarbonate substrate 1 is provided with a groove having a track pitch adjusted within a range of 0.4 to 0.8 µm so that the track pitches vary by a difference of 0.02 µm. On the polycarbonate substrate 1, there are in succession, a 10 nm-thick lower semitransparent layer 7 made from Au, a 100 nm-thick first interference layer 2 made from ZnS—$SiO_2$, a 10 nm-thick optical recording layer 3 having a microstructure that GeSbTe particles 32 are dispersed in a PTFE matrix 31, a 60 nm-thick second interference layer 4 made from ZnS—$SiO_2$, and a 100 nm-thick reflective layer 5 made from an AlTi alloy. In addition, a counter substrate 11 made from polycarbonate is bonded to the reflective layer 5 by means of an adhesive layer 10. This medium fulfills the requirement for $Aa^* < Ac^*$ by adjusting the thickness of the layers.

The optical recording layer 3 is formed by magnetron sputtering of a GeSbTe target and a PTFE target in an Ar gas. The average particle size of the GeSbTe particles is adjusted to about 5 nm by regulating the bias power applied to the substrate. The GeSbTe particle content by volume is adjusted to about 50% by controlling the power ratio applied to the targets.

After the initial crystallization by means of a bulk eraser is carried out, the optical recording medium is subjected to recording/readout tests to evaluate the disk characteristics. In this evaluation, a testing apparatus provided with a semiconductor laser having a wavelength of 650 nm and an object lens having NA of 0.6 is used. In the test, overwrite recording operations are repeated by varying the mark pitch at the positions having different track widths.

As a result, in the range to a mark pitch of 0.5 µm (a bit pitch of 0.3 µm), the above-described medium is found to exhibit excellent characteristics, i.e., a CNR of 50 dB or more, an erase ratio of −30 dB or less and low jitter, after 100,000 overwriting operations. This is because the overwrite jitter diminishes owing to the fulfillment of the requirement for $Aa^* < Ac^*$ and the mass transfer-induced deterioration of the recording layer by overwriting is reduced owing to the employment of the dispersion-type optical recording layer. In this case, it is irrelevant whether Maxwell Garnett absorption is set to meet the condition of Ama<Amc or not. However, it is preferable to set Maxwell Garnett absorption so as to meet the condition of Ama<Amc from a viewpoint of absorbance adjustment.

According to the evaluation of land-groove recording characteristics, it has been found that the cross erase does not occur even if the track width is narrowed to about 0.6 µm, as in the case of Example 3 shown in FIG. 8. This is presumably because the temperature rise at adjacent mark edges is inhibited by the low thermal conductivity of the matrix of the recording layer even by the repeated overwriting.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

We claim:

1. A phase change optical recording medium having a structure such that a phase change optical recording layer which transits between two states of a crystalline state and an amorphous state when irradiated with light is stacked with one or more layers, each selected from the group consisting of an interference layer, a reflective layer, and a semi-transparent layer; wherein the optical recording layer has a microstructure such that particles of optical recording material are dispersed in a matrix made from a dielectric; and wherein the optical recording layer meets the condition of Ama<Amc with respect to Maxwell Garnett absorption, where Ama and Amc are the magnitude of Maxwell Garnett absorption of the optical recording layer in the case where the particles are amorphous and crystalline, respectively, so that the optical recording layer meets the condition of $Aa^* \leq Ac^*$ with respect to effective absorbance, where $Aa^*$ and $Ac^*$ are the effective absorbances of the optical recording layer in the case where the particles are amorphous and crystalline, respectively.

2. The medium according to claim 1, having a structure such that on a transparent substrate, there are stacked a first interference layer, the optical recording layer defined in claim 1, a second interference layer and a reflective layer.

3. The medium according to claim 1, wherein the thermal conductivity of the matrix is lower than that of the optical recording material.

4. The medium according to claim 3, wherein the thermal conductivity of the matrix is in the range of from 0.1 to 0.5 W/mK.

5. The medium according to claim 1, wherein the matrix is made from a porous inorganic material selected from the group consisting of Si—O, Al—O, Zr—O, Si—N, B—N and Si—C.

6. The medium according to claim 1, wherein the matrix is made from a hydrocarbon polymer or a fluorocarbon polymer.

7. The medium according to claim 1, wherein the refractive index of the matrix is in the range of 1.4 to 3.0, the particle size of the optical recording material is in the range of 1 to 20 nm and the optical recording material particle content by volume is in the range of 25 to 85 vol %.

8. A phase change optical recording medium having a structure such that a phase change optical recording layer which transits between two states of a crystalline state and an amorphous state when irradiated with light is stacked with one or more layers, each selected from the group consisting of an interference layer, a reflective layer, and a semi-transparent layer so that the optical recording layer meets the condition of $Aa^* \leq Ac^*$ with respect to effective absorbance, where $Aa^*$ and $Ac^*$ are the effective absorbances of the optical recording layer in the case where the optical recording material is amorphous and crystalline, respectively; wherein the optical recording layer has a microstructure such that particles of optical recording material are dispersed in a matrix made from a dielectric; and wherein the particles are smaller than a light spot.

9. The medium according to claim 8, wherein the size of the particles is in the range of from 10 to 100 nm.

10. The medium according to claim 9, wherein the size of the particles is in the range of from 20 to 50 nm.

11. The medium according to claim 8, wherein spacing between two adjacent particles is in the range of from 1 to 10 nm.

12. The medium according to claim 8, having a structure such that on a transparent substrate, there are stacked a first interference layer, the optical recording layer defined in claim 8, a second interference layer and a semitransparent layer.

13. The medium according to claim 8, having a structure such that on a transparent substrate, there are stacked a semitransparent layer, a first interference layer, the optical recording layer defined in claim 8, a second interference layer and a reflective layer.

14. The medium according to claim 8, wherein the thermal conductivity of the matrix is lower than that of the optical recording material.

15. The medium according to claim 14, wherein the thermal conductivity of the matrix is in the range of from 0.1 to 0.5 W/mK.

16. The medium according to claim 8, wherein the matrix is made from a porous inorganic material selected from the group consisting of Si—O, Al—O, Zr—O, Si—N, B—N and Si—C.

17. The medium according to claim 8, wherein the matrix is made from a hydrocarbon polymer or a fluorocarbon polymer.

* * * * *